(No Model.)

W. E. COOPER.
COUPLING PIN FOR CONNECTING RODS, &c.

No. 256,293. Patented Apr. 11, 1882.

Chas. J. Buchheit.
Edw. J. Brady.
Witnesses.

W. E. Cooper, Inventor.
By Wilhelm Bonner,
Attorneys.

N. PETERS, Photo-Lithographer, Washington, D. C.

UNITED STATES PATENT OFFICE.

WILLIAM E. COOPER, OF DUNKIRK, NEW YORK, ASSIGNOR OF ONE-HALF TO HENRY K. DOW, OF SAME PLACE.

COUPLING-PIN FOR CONNECTING-RODS, &c.

SPECIFICATION forming part of Letters Patent No. 256,293, dated April 11, 1882.

Application filed March 2, 1882. (No model.)

*To all whom it may concern:*

Be it known that I, WILLIAM E. COOPER, of Dunkirk, in the county of Chautauqua and State of New York, have invented a new and useful Improvement in Coupling-Pins for Connecting-Rods and other parts of Machines, of which the following is a specification.

This invention relates to an improvement in those pins which are employed for attaching a connecting-rod or similar moving part of an engine or machine with the adjacent part which imparts motion to the connecting-rod, or to which motion is imparted by the connecting-rod, as the case may be—such, for instance, as the pins whereby the connecting-rod of a steam-engine is connected with the cross-head thereof, or the pins which are employed for connecting together the parts of a parallel rod of a locomotive having three driving-axles. In these pins the greatest and often the only appreciable wear occurs in the direction in which the connecting-rod exerts its thrust against the pin, which latter by reason of this wear gradually becomes flattened to a greater or less degree, and permits the eye of the connecting-rod to play on the pin in the direction of the thrust, which occasions a thumping of the parts and often results in breaking the pin.

The object of my invention is to avoid this difficulty; and it consists of the peculiar construction of the connecting parts, whereby the wearing-surfaces which come in contact with the eye of the connecting-rod in the line of thrust can be changed at will, thereby permitting the part to be adjusted from time to time as may be necessary to maintain a snug fit of the pin in the eye of the connecting-rod in the line of thrust, as will be hereinafter fully set forth.

Figure 1:
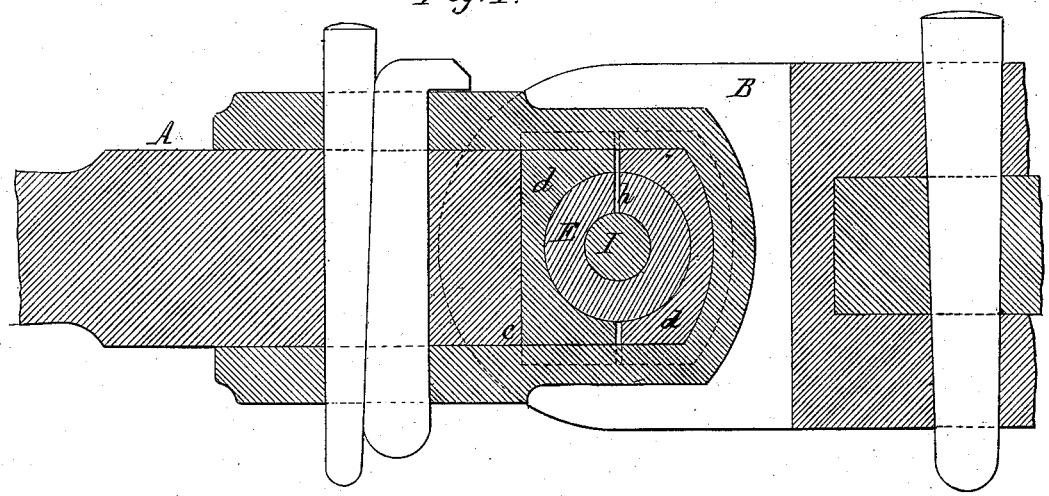
Figure 2:
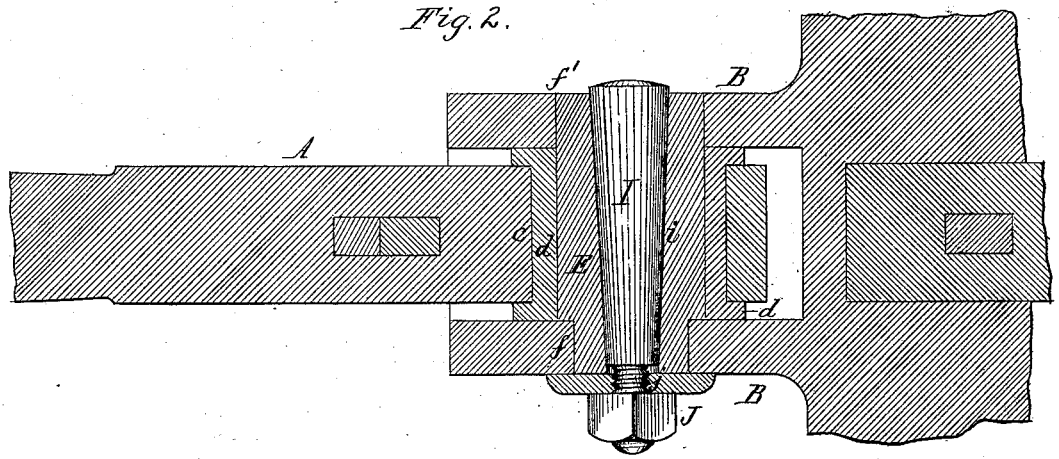
Figure 3:
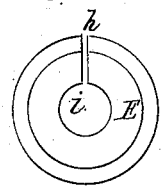
Figure 4:
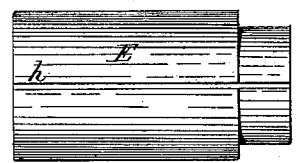
Figure 5:

In the accompanying drawings, Figure 1 is a longitudinal section of the end of a connecting-rod and cross-head provided with my improvement. Fig. 2 is a horizontal section thereof. Fig. 3 is an end view of the slotted sleeve. Fig. 4 is an elevation thereof. Fig. 5 is an elevation of the tapering bolt.

Like letters of reference indicate like parts in each of the figures.

A represents the head of a connecting-rod, and B the jaws of a cross-head or other movable part between which the head of the connecting-rod is arranged.

$c$ represents the eye of the connecting-rod, formed in the head A and surrounded by suitable brasses, $d$.

E represents a cylindrical sleeve, which fits snugly in the eye of the connecting-rod, and which is seated in openings $ff'$, formed respectively in the jaws B of the cross-head. The opening $f$ is somewhat smaller than the opening $f'$, and that portion of the sleeve E which fits in the opening $f$ is reduced in diameter correspondingly. The sleeve E is constructed with a longitudinal slit, $h$, which runs from end to end of the sleeve, and which enables the sleeve to be expanded or contracted within the limits of the elasticity of the material of which the sleeve is constructed. This sleeve is preferably constructed of steel. The sleeve E is constructed with a conical bore, $i$, which tapers toward the small end of the sleeve.

I is a tapering pin or bolt, which fits in the conical bore $i$ of the sleeve, and which is provided at its small end with a screw-bolt, $j$, which projects beyond the side of the jaw of the cross-head, and to which is applied a screw-nut, J, whereby the bolt I is tightened in the conical bore of the slotted sleeve. Upon tightening the screw-nut J the tapering bolt I is drawn in the direction in which it tapers, and the sleeve E is expanded and pressed against the inner walls of the openings $ff'$ with sufficient force to prevent it from turning in its seats. The outer cylindrical surface of the slotted sleeve which lies between the jaws of the cross-head and is inclosed by the eye of the connecting-rod is subjected to the wear which results from the movement of the connecting-rod on this sleeve. When the portions of the sleeve which lie in the line of thrust have become worn the bolt I is loosened sufficiently to permit the sleeve E to be turned in the seat.

The sleeve is then turned so as to bring a new portion of the surface of the sleeve in the line of thrust, and in this manner a snug fit of the parts in the line of thrust is readily maintained.

It is obvious that the tapering bolt may be tightened by a wedge-key instead of a screw and nut, as shown.

I claim as my invention—

The combination, with the parts A and B, of a slotted sleeve, E, and a tapering bolt, I, whereby the parts A and B are connected, substantially as set forth.

WM. E. COOPER.

Witnesses:
FRED G. WYMAN,
JOHN H. COLGAN.